United States Patent [19]
Murray

[11] 3,874,261
[45] Apr. 1, 1975

[54] ROTARY SAW JIG

[76] Inventor: Gerald Atlee Murray, 7360 Bluestone St., Reno, Nev. 89502

[22] Filed: June 18, 1973

[21] Appl. No.: 370,806

[52] U.S. Cl.................. 83/471.3, 83/522, 83/821
[51] Int. Cl............................................. B27b 9/04
[58] Field of Search ....... 83/471.2, 471.3, 522, 468, 83/467, 821, 743, 745

[56] References Cited
UNITED STATES PATENTS

| | | | |
|---|---|---|---|
| 2,677,399 | 5/1954 | Getsinger | 83/471.2 |
| 2,735,455 | 2/1956 | Forsberg | 83/522 |
| 3,124,176 | 3/1964 | Vogini | 83/522 X |

Primary Examiner—Donald R. Schran
Attorney, Agent, or Firm—Limbach, Limbach & Sutton

[57] ABSTRACT

A guide for moving a circular saw along a straight edge in order too cut a lumber, the guide consisting of a guide strip which at one end is securable over one edge of the lumber to be sawn by means of a front clamp, the opposite end of the guide strip being securable upon the opposite edge of the lumber by means of a rear clamp, or else this end of the guide strip is attachable by a nut and bolt to a guide strip extension which at its opposite end is secured to the rear clamp, and the front clamp including an angle adjustment for positioning the device selectively either at 30, 45 or 60 degree angles.

2 Claims, 4 Drawing Figures

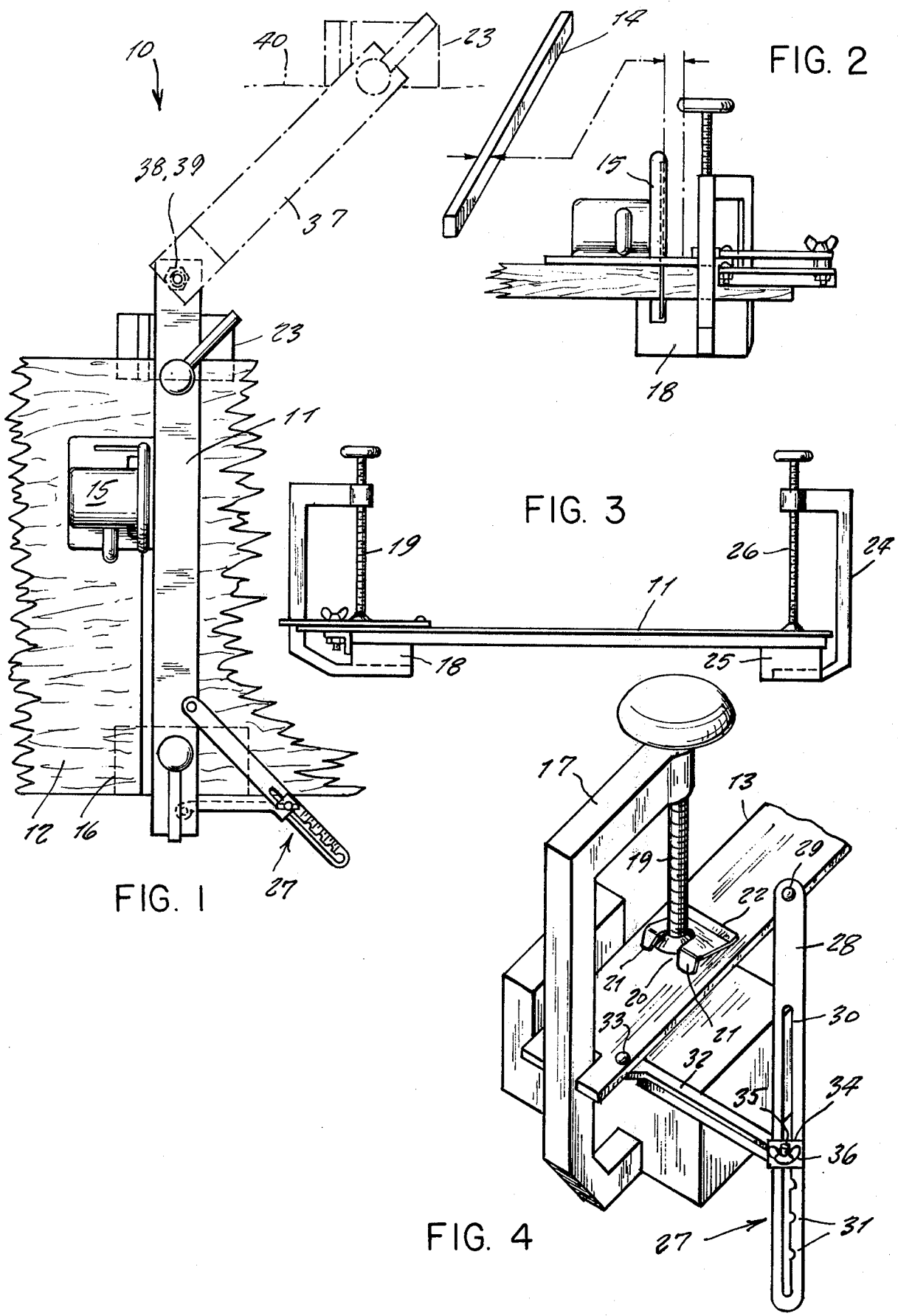

ROTARY SAW JIG

This invention relates generally to straight edge devices.

A principal object of the present invention is to provide a rotary saw jig that comprises a guide for a portable power circular saw so to enable a user to make a controlled cut therewith, the saw guide essentially comprising a straight edge.

Another object of the present invention is to provide a rotary saw jig that can be readily clamped to the wood or other material that is being sawed.

Still another object of the present invention is to provide a rotary saw jig wherein a straight edge thereof is readily adjustable at different angles so that diagonal cuts may be provided across a board.

Yet another object of the present invention is to provide a rotary saw jig which can be incorporated selectively with an extension so that it is adaptable for use on lumber that is extra wide.

Other objects of the present invention are to provide a rotary saw jig which is simple in design, inexpensive to manufacture, rugged in construction, easy to use and efficient in operation.

These and other objects will be readily evident upon a study of the following specification together with the accompanying drawing wherein:

FIG. 1 is a top plan view of the present invention shown in operative use cutting a lumber;

FIG. 2 is a front end elevation view thereof;

FIG. 3 is a side elevation view of the present invention; and

FIG. 4 is a perspective view of a front clamp of the present device.

Reference is now made to the drawing in detail wherein the reference numeral 10 represents a rotary saw jig, according to the present invention, wherein there is a guide strip 11 that comprises a straight edge for being positioned an upper side of a lumber 12 that is intended to be sawn. The straight edge includes a straight longitudinal side edge 13 that serves as a guide and against which a marking bar 14 can be positioned so that the movement of a circular saw 15 can be guided across the lumber.

At one end, the guide strip 11 is attached to a front clamp 16 that includes a C-clamp 17 which at its lower end is fitted under a spacer block 18 and which at its upper end has a threaded opening that receives an adjustable hold-down bolt 19 which at its lower end bears against the upper side of the straight edge guide strip, the lower end of the bolt being fitted into a notch 20 formed between spring fingers 21 of a tongue 22 that is secured upon the upper side of the straight edge.

The opposite end of guide strip straight edge is secured upon the opposite end of the lumber 12 by means of a rear clamp 23 that is comprised of a C-clamp 24, the lower end of which is fitted under a spacer block 25, the upper end of the C-clamp having a threaded opening that receives a hold-down bolt 26 for bearing against the upper side of the straight edge and which is likewise fitted into a notch of a similar tongue 22 as is above described.

The front clamp 16 also includes an angle adjustment 27 so that the guide can be positioned adjustably respective to the lumber 12 at either 30 degrees, 45 degrees or 60 degrees. The angle adjustment 27 includes a leg 28 which at one end is positioned upon an upper side of the straight edge and secured thereto pivotally by means of a pin or rivet 29. The opposite end of the leg 28 includes an elongated slot 30 provided with a series of several notches 31 each of the notches corresponding for one of the desired angles. Another leg 32 is attached pivotally at one end underneath the straight edge by means of a pin or rivet 33, the opposite end of the leg 32 supporting a slide 34 that rides upon the leg 28 and which carries a bolt 35 that is fitted through the slot 30 and which is secured in selected position by means of a wing nut 36.

The present invention also incorporates a guide strip extension 37 which is selectively attachable to one end of the straight edge by means of a nut and bolt 38 and 39 respectively and which enables a user to thus saw a wider board 40. It is to be noted that in such instant, the rear clamp instead of being at the end of the guide strip 11 is thus brought to the opposite end of the guide strip extension, as is shown in FIG. 1 by the dotted lines.

In operative use, it is now evident that the circular saw can now cut a lumber of different widths and the cut may be made at different angles. The straight edge is to be adjusted to the cut mark line by lining up with the marker strip or bar 14 that is the exact distance of the blade outside to the straight edge.

Thus there is provided a rotary saw jig that serves a useful purpose.

What I now claim is:

1. In an electric saw jig for cutting a piece of lumber the combination of:

first and second spacer blocks each having lower and upper surfaces respectively to rest on a support surface and to support the lower surface of the piece of lumber to be sawn, a guide strip having a longitudinal straight edge at one side thereof serving to guide an electric saw being moved across the lumber and which at one end is adapted to be secured upon the side of the piece of lumber to be sawn, a first clamp means connected at one portion thereof to said first spacer block above the lower surface thereof and having another portion adapted for engaging said guide strip adjacent one end portion thereof, a second clamp means connected at one portion thereof to said second spacer block above the lower surface thereof and having another portion adapted for engaging said guide strip adjacent the other end portion thereof, said first and second clamp means clamping the piece of lumber to be sawn between said spacer blocks and said guide strip at a location above the support surface at the lower surface of said first and second spacer blocks.

2. The combination set forth in claim 1 wherein each of said clamp means comprises a C-clamp with the lower portion thereof constituting said one portion of said clamp means connected to said spacer block and including a threaded opening at the upper portion of the C-clamp and a hold-down adjustable bolt means threadably received in said opening and engaging means at the lower end of said bolt means constituting the portion adapted for engaging said guide strip.

* * * * *